(12) United States Patent
Waugh

(10) Patent No.: US 10,563,800 B2
(45) Date of Patent: Feb. 18, 2020

(54) APPARATUS FOR COUPLING TUBULAR COMPONENTS AND ASSOCIATED METHODS

(71) Applicant: The Boeing Company, Chicago, IL (US)

(72) Inventor: Gregory M. Waugh, Renton, WA (US)

(73) Assignee: The Boeing Company, Chicago, IL (US)

( * ) Notice: Subject to any disclaimer, the term of this patent is extended or adjusted under 35 U.S.C. 154(b) by 820 days.

(21) Appl. No.: 14/988,454

(22) Filed: Jan. 5, 2016

(65) Prior Publication Data

US 2017/0191591 A1 Jul. 6, 2017

(51) Int. Cl.
*F16L 25/01* (2006.01)
*F16L 25/02* (2006.01)
*F16L 19/02* (2006.01)
*F16L 19/00* (2006.01)
*F16L 19/04* (2006.01)

(52) U.S. Cl.
CPC ........... *F16L 25/023* (2013.01); *F16L 19/005* (2013.01); *F16L 19/0231* (2013.01); *F16L 19/041* (2013.01); *F16L 25/01* (2013.01)

(58) Field of Classification Search
CPC ..... F16L 19/041; F16L 25/01; F16L 19/0231; F16L 19/005; F16L 25/023
See application file for complete search history.

(56) References Cited

U.S. PATENT DOCUMENTS 3,999,825 A * 12/1976 Cannon ................... F16L 23/06
439/192
4,703,988 A 11/1987 Raux et al.
(Continued)

FOREIGN PATENT DOCUMENTS

WO 9007076 6/1990
WO 9957477 11/1999

OTHER PUBLICATIONS

Extended European Search Report for European Patent Application No. 16192499.8 dated May 9, 2017.
(Continued)

*Primary Examiner* — David Bochna
*Assistant Examiner* — James A Linford
(74) *Attorney, Agent, or Firm* — Kunzler Bean & Adamson

(57) ABSTRACT

An apparatus for coupling together tubular components is described herein. The apparatus includes a coupling assembly with a coupling device having threads and an internal groove. The coupling assembly also includes a retainer clip positionable in the internal groove. The retainer clip is biased to apply a radially outward force against the internal groove when the retainer clip is positioned in the internal groove. The coupling assembly includes a ferrule, coupleable to the coupling device, in contact with the retainer clip when coupled to the coupling device to form an electrically conductive path through the coupling device, the retainer clip, and the ferrule. The retainer clip is configured to prevent movement of the coupling device relative to the ferrule when the retainer clip has an unbiased inner diameter smaller than an outer diameter of the ferrule or the retainer clip is not properly inserted into the internal groove.

17 Claims, 11 Drawing Sheets

(56) References Cited

U.S. PATENT DOCUMENTS

| | | | | |
|---|---|---|---|---|
| 4,808,117 A * | 2/1989 | Gale | ........................ | F16L 25/01 |
| | | | | 439/192 |
| 4,928,202 A * | 5/1990 | Gale | ..................... | F16L 19/005 |
| | | | | 174/47 |
| 5,786,976 A * | 7/1998 | Field | ........................ | F16L 25/01 |
| | | | | 361/215 |
| 5,959,828 A * | 9/1999 | Lewis | ...................... | F16L 25/01 |
| | | | | 361/212 |
| 6,073,973 A * | 6/2000 | Boscaljon | .............. | F16L 19/005 |
| | | | | 285/354 |
| 2004/0140667 A1* | 7/2004 | Breay | ..................... | F16L 5/025 |
| | | | | 285/189 |
| 2009/0322078 A1* | 12/2009 | Wern | ...................... | F16L 25/01 |
| | | | | 285/413 |

OTHER PUBLICATIONS

Examination Report for European Patent Application No. 16192499.8 dated Aug. 31, 2018.

\* cited by examiner

APPARATUS FOR COUPLING TUBULAR COMPONENTS AND ASSOCIATED METHODS

FIELD

This disclosure relates generally to tubular components, and more particularly to apparatuses for coupling together tubular components.

BACKGROUND

Tubular components may be used to carry fluids. Often, one or more tubular components are coupled together at their respective ends to make a longer tubular assembly. Connections between tubular components of a tubular assembly may be reinforced to ensure that carried fluids do not leak out of the connections.

Furthermore, certain fluids may react to an electric charge. Accordingly, some tubular components may be electrically grounded so that any environmentally-induced electric charge near the tubular components is electrically discharged to ground.

SUMMARY

The subject matter of the present application provides embodiments of methods for connecting tubular components, that overcome the above-discussed shortcomings of prior art techniques. In other words, the subject matter of the present application has been developed in response to the present state of the art, and in particular, in response to shortcomings of conventional methods and apparatuses for quickly and effectively connecting tubular components.

According to one embodiment, a first apparatus for coupling together first and second tubular components of a duct assembly includes a first coupling assembly. The first coupling assembly includes a nut assembly having internal threads and a first internal groove. The first coupling assembly also includes a first retainer clip positionable in the first internal groove of the nut assembly. In some implementations, the first retainer clip is biased to apply a radially outward force against the first internal groove when the first retainer clip is positioned in the first internal groove. The first coupling assembly includes a first ferrule, coupleable to the nut assembly, in contact with the first retainer clip when coupled to the nut assembly to form a first electrically conductive path through the nut assembly, the first retainer clip, and the first ferrule. In various implementations, the first ferrule is configured to be coupled to a first end of the first tubular component. The first coupling assembly also includes a spring positionable within the nut assembly adjacent to the first retainer clip. In certain implementations, the spring includes at least one lateral extension extending parallel to a central axis of the nut assembly. The first apparatus also includes a second coupling assembly. The second coupling assembly includes a coupling body having external threads, a second internal groove, and at least one notch on a first end of the coupling body configured to mate with the nut assembly. In one implementation, the external threads of the coupling body are configured to mate with the internal threads of the nut assembly, and the at least one notch is configured to receive the at least one lateral extension of the spring to prevent rotation of the coupling body relative to the nut assembly. The second coupling assembly also includes a second retainer clip positionable in the second internal groove of the coupling body. In various implementations, the second retainer clip is biased to apply a radially outward force against the second internal groove when the second retainer clip is positioned in the second internal groove. The second coupling assembly includes a second ferrule, coupleable to the coupling body, in contact with the second retainer clip when coupled to the coupling body to form a second electrically conductive path through the coupling body, the second retainer clip, and the second ferrule. In certain implementations, the second ferrule is configured to be coupled to a second end of the second tubular component.

In some implementations of the first apparatus, the first and second retainer clips are substantially c-shaped. The first and second retainer clips may include gripping portions adjacent to first and second ends of the c-shape to facilitate installation and removal of the first and second retainer clips.

In one implementation of the first apparatus, the nut assembly includes a first end configured to mate with the coupling body and a second end opposite the first end. The second end of the nut assembly may include features for matingly engaging a torque-application tool, configured to apply torque to the nut assembly for coupling together the nut assembly and the coupling body. Alternatively, the second end of the nut assembly may be configured for hand-tightening.

According to some implementations of the first apparatus, the coupling body includes a second end opposite the first end. The second end of the coupling body may include features for matingly engaging a torque-application tool, configured to apply torque to the coupling body for coupling together the coupling body and the nut assembly. Alternatively, the second end of the coupling body may be configured for hand-tightening.

In certain implementations of the first apparatus, the second retainer clip is configured to prevent movement of the coupling body relative to the second ferrule when the second retainer clip has an unbiased inner diameter smaller than an outer diameter of the second ferrule or the second retainer clip is not properly inserted into the second internal groove of the coupling body.

According to various implementations of the first apparatus, the first retainer clip is configured to prevent movement of the nut assembly relative to the first ferrule when the first retainer clip has an unbiased inner diameter smaller than an outer diameter of the first ferrule or the first retainer clip is not properly inserted into the first internal groove of the nut assembly.

In some implementations of the first apparatus, the coupling body is rigid, while in other implementations of the first apparatus, the coupling body is flexible.

In certain implementations of the first apparatus, the spring is annular shaped. The at least one lateral extension includes multiple bumps or detents on the spring, the multiple bumps extending parallel to the central axis of the nut assembly.

According to some implementations of the first apparatus, the at least one notch of the coupling body includes multiple notches for receiving multiple lateral extensions protruding from the spring.

In one implementation, the first apparatus includes a tube. The first coupling assembly is coupled to a first end of the tube and the second coupling assembly is coupled to a second end of the tube. The tube may be flexible or rigid.

According to one embodiment, a method of coupling together first and second tubular components includes inserting a retainer clip into an internal groove of a first coupling device. The retainer clip is configured to apply a radially outward force to the internal groove when inserted in the internal groove. The method also includes sliding the first coupling device with the retainer clip over a ferrule. The retainer clip is configured to prevent movement of the first coupling device relative to the ferrule when the retainer clip has an unbiased inner diameter smaller than an outer diameter of the ferrule or the retainer clip is not properly inserted into the internal groove of the first coupling device. The first coupling device, the retainer clip, and the ferrule are in contact with one another to form an electrically conductive path through the first coupling device, the retainer clip, and the ferrule.

In some implementations, the method includes coupling the ferrule to a tube to form a first tubular component. In various implementations, the method includes coupling a second tubular component having a second coupling device to the first coupling device. A spring is positionable within one of the first and second coupling devices and another of the first and second coupling devices includes at least one notch. The spring includes at least one lateral extension extending parallel to a central axis of the first and second coupling devices. The at least one notch is configured to receive the at least one lateral extension of the spring to prevent rotation of the first coupling device relative to the second coupling device.

According to yet another embodiment, a second apparatus for coupling together first and second tubular components of a duct assembly includes a first coupling assembly. The first coupling assembly includes a first coupling device having first threads and a first internal groove. The first coupling assembly also includes a first retainer clip positionable in the first internal groove. The first retainer clip is biased to apply a radially outward force against the first internal groove when the first retainer clip is positioned in the first internal groove. The first coupling assembly includes a first ferrule, coupleable to the first coupling device, in contact with the first retainer clip when coupled to the first coupling device to form a first electrically conductive path through the first coupling device, the first retainer clip, and the first ferrule. The first retainer clip is configured to prevent movement of the first coupling device relative to the first ferrule when the first retainer clip has an unbiased inner diameter smaller than an outer diameter of the first ferrule or the first retainer clip is not properly inserted into the first internal groove of the first coupling device.

In certain implementations of the second apparatus, the first coupling assembly includes a spring having at least one lateral extension extending parallel to a central axis of the coupling device and configured to prevent rotation of the coupling device relative to another coupling device.

According to various implementations, the second apparatus includes a second coupling assembly. The second coupling assembly includes a second coupling device having second threads and a second internal groove. The second coupling assembly also includes a second retainer clip positionable in the second internal groove. The second retainer clip is biased to apply a radially outward force against the second internal groove when the second retainer clip is positioned in the second internal groove. The second coupling assembly includes a second ferrule, coupleable to the second coupling device, in contact with the second retainer clip when coupled to the second coupling device to form a second electrically conductive path through the second coupling device, the second retainer clip, and the second ferrule. The second retainer clip is configured to prevent movement of the second coupling device relative to the second ferrule when the second retainer clip has an unbiased inner diameter smaller than an outer diameter of the second ferrule or the second retainer clip is not properly inserted into the second internal groove of the second coupling device. The first coupling assembly is coupled to the second coupling assembly.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
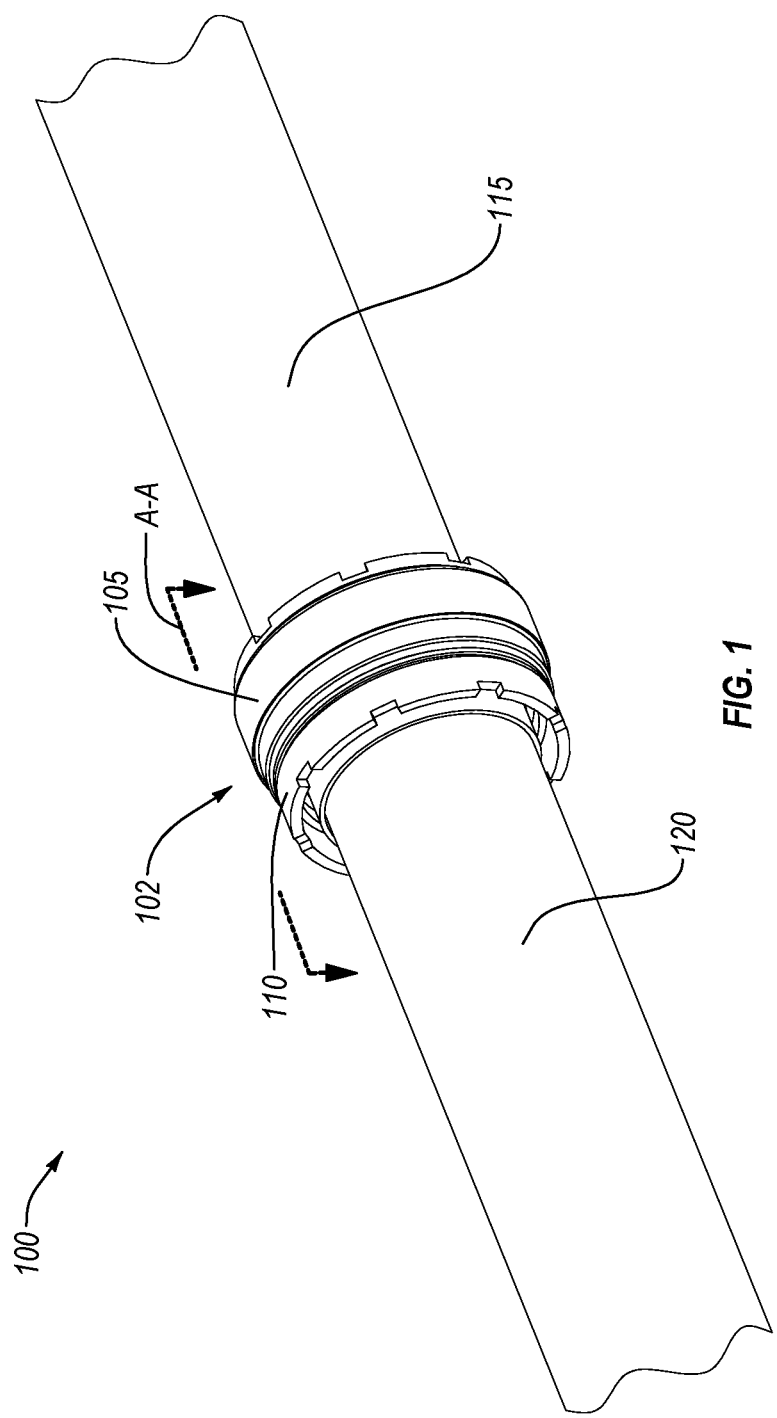
FIG. 1 is a perspective view of one embodiment of an apparatus for coupling together first and second tubular components of a duct assembly.

Referring to FIG. 1, and according to one embodiment, an apparatus 102 for coupling together first and second tubular components 115, 120 of a duct assembly 100 is shown. The apparatus 102 includes a first coupling assembly 105 and a second coupling assembly 110. The first coupling assembly 105 is shown coupled to the second coupling assembly 110. Moreover, the first tubular component 115 is attached to the first coupling assembly 105. Similarly, the second tubular component 120 is attached to the second coupling assembly 110.

Generally, the first and second tubular components 115, 120 each defines an open-ended, circumferentially enclosed, hollow channel through which fluid may flow. The first and second tubular components 115, 120 may be any of various tubular components, such as rigid tubes, flexible tubes, rigid hoses, flexible hoses, rigid ducts, flexible ducts, and so forth. Moreover, the first and second tubular components 115, 120 may be made from any of various materials. In one implementation, the first and second tubular components 115, 120 may include a tubular-shaped insulated material surrounded by a tubular-shaped electrically conductive material.

The first and second coupling assemblies 105, 110 are configured to be coupled together to ensure that fluids carried by the first and second tubular components 115, 120 (e.g., from the first tubular component to the second tubular component, or vice-versa) do not leak. Generally, the first and second coupling assemblies 105, 110 are locked together using internal locking features that will be explained in greater detail below with regards to FIGS. 2-7. In addition, the first and second coupling assemblies 105, 110 each includes electrically conductive portions configured to collectively form an electrically conductive path between the first tubular component 115 and the second tubular component 110 via the first and second coupling assemblies 105, 110, as will be explained in greater detail below also with regards to FIGS. 2-7.

Figure 2:
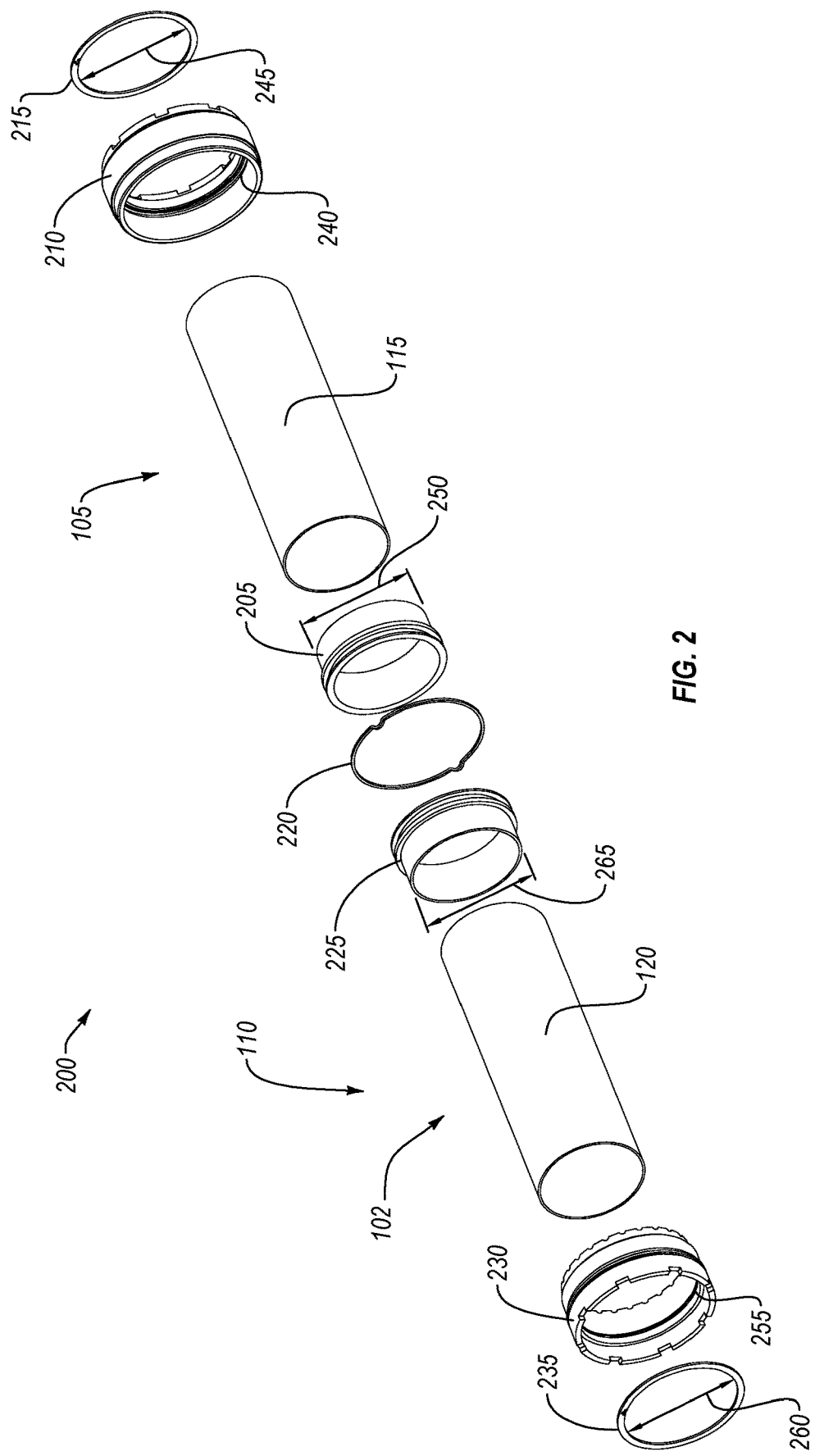
FIG. 2 is an exploded perspective view of the apparatus of FIG. 1 showing a first coupling assembly separated from a second coupling assembly according to one embodiment.

Referring to FIG. 2, an exploded perspective view of the apparatus 102 of FIG. 1 is illustrated showing the first coupling assembly 105 separated from the second coupling assembly 110. The first coupling assembly 105 includes a first ferrule 205, a nut assembly 210 (i.e., coupling device), a first retainer clip 215, and a spring 220. Moreover, the second coupling assembly 110 includes a second ferrule 225, a coupling body 230 (i.e., coupling device), and a second retainer clip 235. Each of the first ferrule 205, nut assembly 210, and spring 220 of the first coupling assembly 105 and each of the second ferrule 225 and coupling body 230 of the second coupling assembly 110 is substantially annularly-shaped to define an interior channel. As may be appreciated, the components of the first and second coupling assemblies 105, 110 may be made from any suitable materials. For example, in one configuration, the components of the first and second coupling assemblies 105, 110 may be made from any of various electrically conductive materials, such as electrically-conductive metals.

The first ferrule 205 is shaped and sized to matingly receive an end portion of the first tubular component 115. In certain implementations, the first ferrule 205 is permanently attached about the end portion of the first tubular component 115, such as via, welding, swaging, bonding, fastening, or the like. Furthermore, during assembly, the first retainer clip 215 is positioned in a first internal groove 240 of the nut assembly 210. The first retainer clip 215 is biased to apply a radially outward force against the first internal groove 240 when the first retainer clip 215 is positioned in the first internal groove 240. For example, in one implementation, the first retainer clip 215 can be a conventional c-clip as is known in the art.

An unbiased inner diameter 245 of the first retainer clip 215 is sized to fit around the first ferrule 205. Accordingly, an outer diameter 250 of the first ferrule 205 may be sized to be substantially the same or slightly smaller than the unbiased inner diameter 245 of the first retainer clip 215. Moreover, during assembly, the first ferrule 205 is inserted into the nut assembly 210 while the first retainer clip 215 is in the first internal groove 240. The first ferrule 205 is sized and shaped so that when coupled to the nut assembly 210 and the first retainer clip 215, the first ferrule 205 is in contact with the first retainer clip 215 to form an electrically conductive path through the nut assembly 210, the first retainer clip 215, and the first ferrule 205. In addition, the first retainer clip 215 is configured to prevent movement of the nut assembly 210 relative to the first ferrule 205 when the unbiased inner diameter 245 of the first retainer clip 215 is smaller than the outer diameter 250 of the first ferrule 205, or if the first retainer clip 215 is not properly inserted into the first internal groove 240 of the nut assembly 210. Accordingly, if the first retainer clip 215 is an incorrect size, or is not properly inserted into the first internal groove 240 of the nut assembly 210, the first retainer clip 215 will not fit over the first ferrule 205, thereby preventing coupling of the nut assembly 210 with the first ferrule 205. Therefore, in certain embodiments, manufacturing of the first coupling assembly 105 may be considered error-proof (e.g., only the correct combination of components may be assembled). Furthermore, in some embodiments, inadvertent misassembly of the first coupling assembly 105 may be avoided by using the components of the first coupling assembly 105 as described herein. Thus, potential leaks, electrical shorts, and time wasted by performing additional assembly steps caused by misassembly may be avoided.

The spring 220 is positionable within the nut assembly 210 directly adjacent to the first retainer clip 215. During assembly, the spring 220 may be inserted into the nut assembly 210 after the nut assembly 210 and the first retainer clip 215 are coupled to the first ferrule 205. In some configurations, the nut assembly 210 may be rigid, while in other configurations, the nut assembly 210 may be flexible. Accordingly, the nut assembly 210 may be used in a variety of applications that use either rigid or flexible components.

The second ferrule 225 has a shape and size such that, during assembly, an end of the second tubular component 120 may be matingly received within the second ferrule 225. In certain implementations, the second ferrule 225 is permanently attached about the end portion of the second tubular component 120, such as via, welding, swaging, bonding, fastening, or the like. Furthermore, during assembly, the second retainer clip 235 is positioned in a second internal groove 255 of the coupling body 230. The second retainer clip 235 is biased to apply a radially outward force against the second internal groove 255 when the second retainer clip 235 is positioned in the second internal groove 255. For example, in one implementation, the second retainer clip 235 can be a conventional c-clip as is known in the art.

An unbiased inner diameter 260 of the second retainer clip 235 is sized to fit around the second ferrule 225. Accordingly, an outer diameter 265 of the second ferrule 225 may be sized to be substantially the same or slightly smaller than the unbiased inner diameter 260 of the second retainer clip 235. Moreover, during assembly, the second ferrule 225 is inserted into the coupling body 230 while the second retainer clip 235 is in the second internal groove 255. The second ferrule 225 is sized and shaped so that when coupled to the coupling body 230 and the second retainer clip 235, the second ferrule 225 is in contact with the second retainer clip 235 to form an electrically conductive path through the coupling body 230, the second retainer clip 235, and the second ferrule 225. In addition, the second retainer clip 235 is configured to prevent movement of the coupling body 230 relative to the second ferrule 225 when the unbiased inner diameter 260 of the second retainer clip 235 is smaller than the outer diameter 265 of the second ferrule 225, or if the second retainer clip 235 is not properly inserted into the second internal groove 255 of the coupling body 230. Accordingly, if the second retainer clip 235 is an incorrect size, or is not properly inserted into the second internal groove 255 of the coupling body 230, the second retainer clip 235 will not fit over the second ferrule 225, thereby preventing coupling of the coupling body 230 with the second ferrule 225. Therefore, in certain embodiments, manufacturing of the second coupling assembly 110 may be considered error-proof (e.g., only the correct combination of components may be assembled). Furthermore, in some embodiments, inadvertent misassembly of the second coupling assembly 110 may be avoided by using the components of the second coupling assembly 110 as described herein. Thus, potential leaks, electrical shorts, and time wasted by performing additional assembly steps caused by misassembly may be avoided. In some configurations, the coupling body 230 may be rigid, while in other configurations, the coupling body 230 may be flexible. Accordingly, the coupling body 230 may be used in a variety of applications that use either rigid or flexible components.

Figure 3:
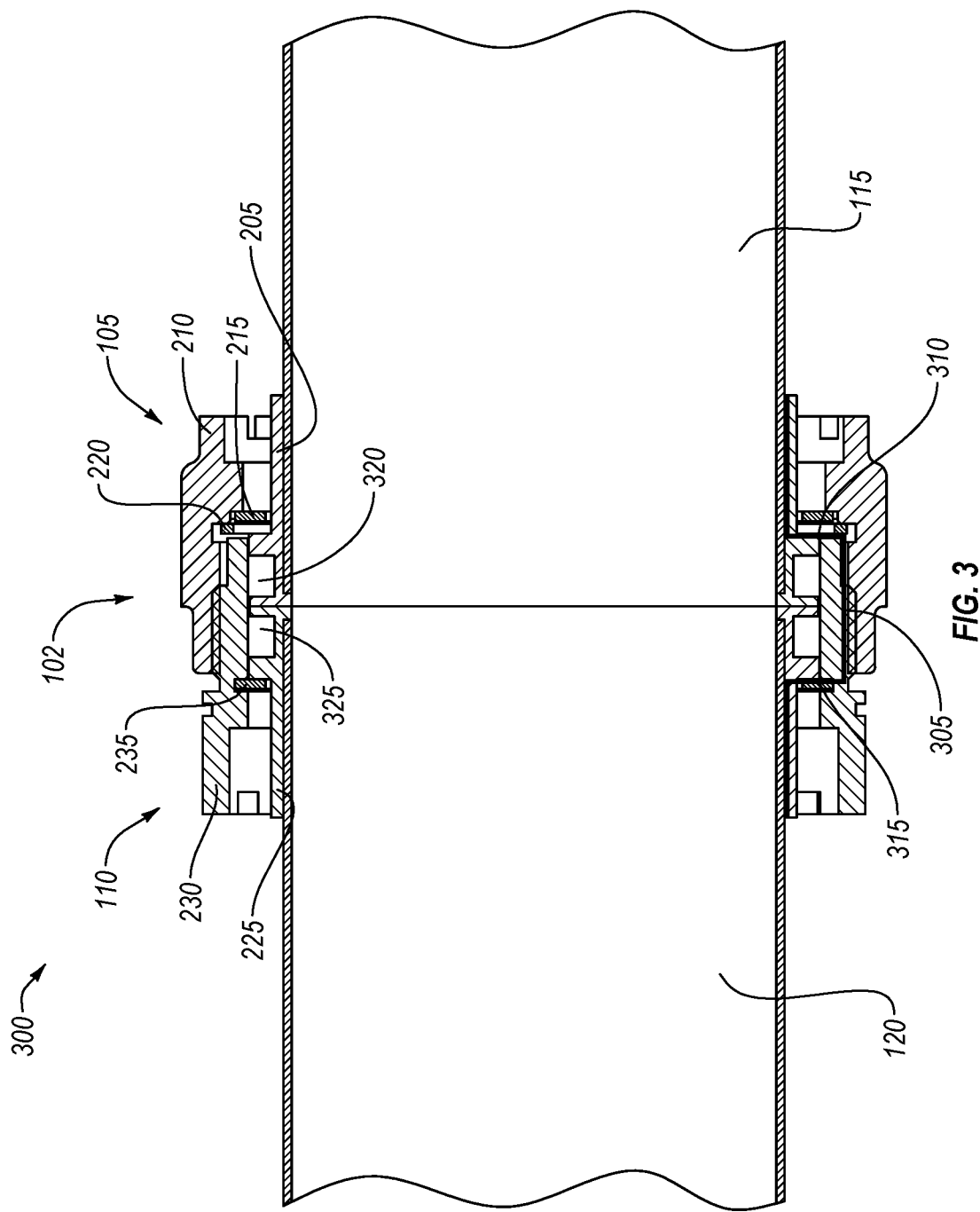
FIG. 3 is a cross-sectional view of the apparatus of FIG. 1 taken along the line A-A of FIG. 1.

Referring to FIG. 3, a cross-sectional view 300 of the apparatus 102 is illustrated showing the first coupling assembly 105 and the second coupling assembly 110 coupled together. While the first coupling assembly 105 is coupled to the second coupling assembly 110, an electrically conductive path 305 is formed from the first tubular component 115 to the second tubular component 120. Specifically, a first electrically conductive path 310 is formed by contact between the first tubular component 115, the first ferrule 205, the nut assembly 210, and the first retainer clip 215. Moreover, a second electrically conductive path 315 is formed by contact between the second tubular component 120, the second ferrule 225, the coupling body 230, and the second retainer clip 235. In addition, threads of the coupling body 230 contact threads of the nut assembly 210 to complete the first and second electrically conductive paths 310, 315. Accordingly, by defining the electrically conductive paths 305, 315 there is electrical conductivity between the first tubular component 115 and the second tubular component 120. Moreover, the electrically conductive paths 305, 315 are formed merely by coupling the first coupling assembly 105 to the second coupling assembly 110, without the need for bonding or jumper wires between the various components. Therefore, time and components for facilitating electrical conductively between two tubular components of a duct assembly, as compared to assemblies that use bonding or jumper wires, are decreased.

As illustrated, the first ferrule 205 includes a first groove 320 for receiving a first O-ring (not shown) and the second ferrule 225 includes a second groove 325 for receiving a second O-ring (not shown). The first O-ring may contact the first ferrule 205 and the coupling body 230 to form a seal to prevent fluid from exiting the connection between the first and second coupling assemblies 105, 110. Moreover, the second O-ring may contact the second ferrule 225 and the coupling body 230 to form a seal to prevent fluid from exiting the connection between the first and second coupling assemblies 105, 110.

Figure 4:
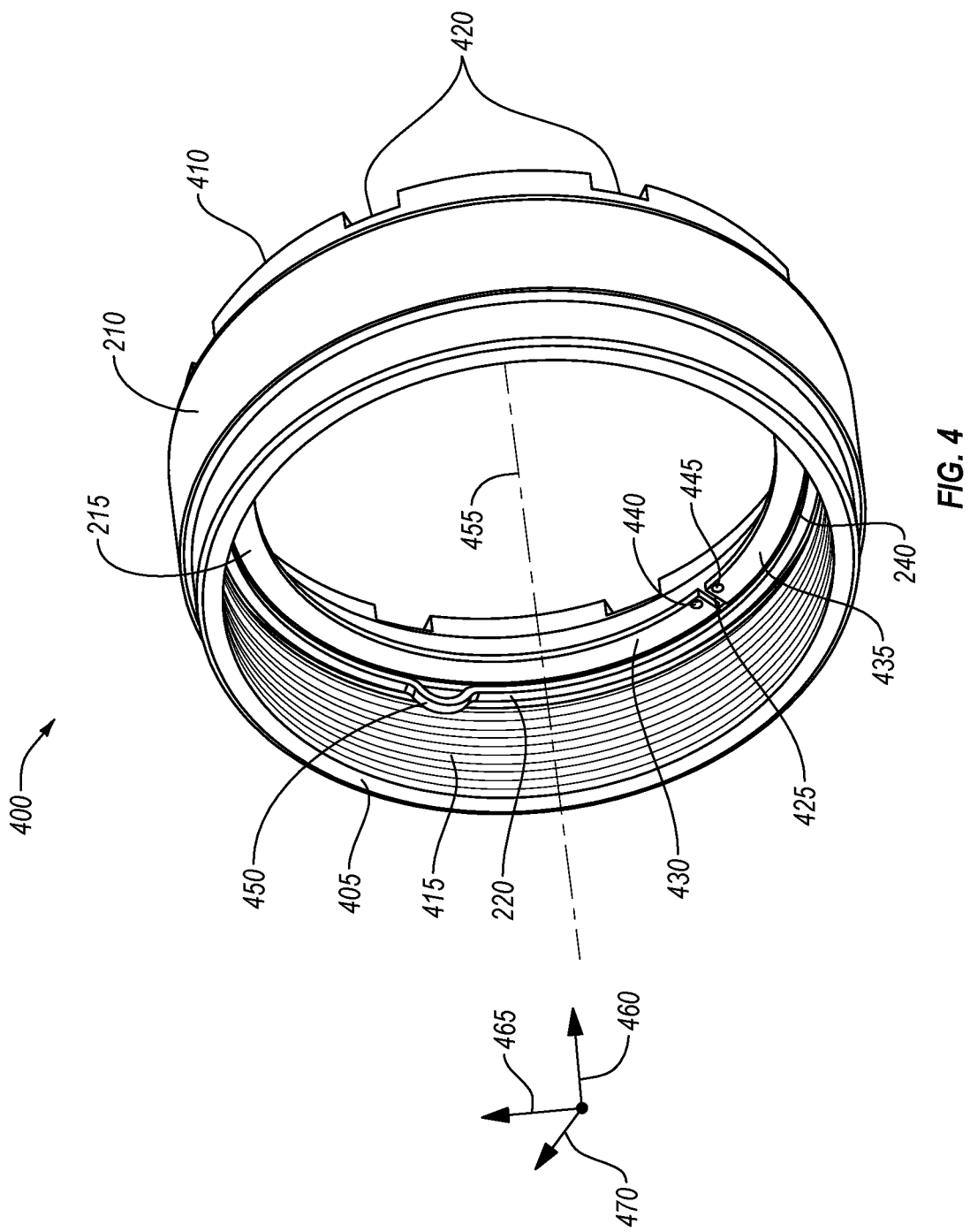
FIG. 4 is a perspective view of one embodiment of a portion of a first coupling assembly of the apparatus of FIG. 1.

Referring to FIG. 4, a perspective view of one embodiment of a portion 400 of the first coupling assembly 105 of the apparatus 102 of FIG. 1 is shown. As illustrated, the nut assembly 210 includes a first end 405 and a second end 410 opposite the first end 405. The first end 405 of the nut assembly 210 is configured to mate with the coupling body 230. On an internal portion of the nut assembly 210 adjacent to the first end 405, the nut assembly 210 includes threads 415 used to couple the nut assembly 210 to the coupling body 230. On the second end 410 of the nut assembly 210, multiple features 420 (i.e., notches, teeth, etc.) for matingly engaging a torque-application tool (e.g., wrench) are disposed. The features 420 may be configured for applying torque to the nut assembly 210 for coupling together the nut assembly 210 and the coupling body 230. In other configurations, the nut assembly 210 may not include the features 420 and may be hand tightened to the coupling body 230 instead of being coupled using a torque-application tool.

As illustrated, the first retainer clip 215 may be substantially c-shaped such that a gap 425 is formed between a first end 430 of the first retainer clip 215 and a second end 435 of the first retainer clip 215, respectfully. Moreover, a first gripping portion 440 is positioned near the first end 430 of the first retainer clip 215, and a second gripping portion 445 is positioned near the second end 435 of the first retainer clip 215. The first and second gripping portions 440, 445 may be any suitable protrusion extending from the first retainer clip 215 that can be used for applying a circumferentially directed force to the first and second ends 430, 435 of the first retainer clip 215 to draw together the first and second ends. The first and second gripping portions 440 and 445 facilitate insertion of the first retainer clip 215 into the first internal groove 240 and removal of the first retainer clip 215 from the first internal groove 240. For example, applying a force to direct the first and second gripping portions 440 and 445 toward one another may be used to decrease an outer diameter of the first retainer clip 215 to facilitate insertion of the first retainer clip 215 into the first internal groove 240 and removal of the first retainer clip 215 from the first internal groove 240. It should be noted that the first retainer clip 215 biased such that when inserted into the first internal groove 240, the first retainer clip is configured to apply a radially outward force in radial directions 465, 470 toward the first internal groove 240.

The spring 220 is illustrated as being positioned within the nut assembly 210. Moreover, the spring 220 includes at least one lateral extension 450 extending (e.g., protruding)

parallel to a central axis 455 of the nut assembly 210. The at least one lateral extension 450 and the central axis 455 extend in an axial direction 460 that is perpendicular to the radial directions 465 and 470. The at least one lateral extension 450 is used to lock the nut assembly 210 to the coupling body 230 when mated.

Figure 5:
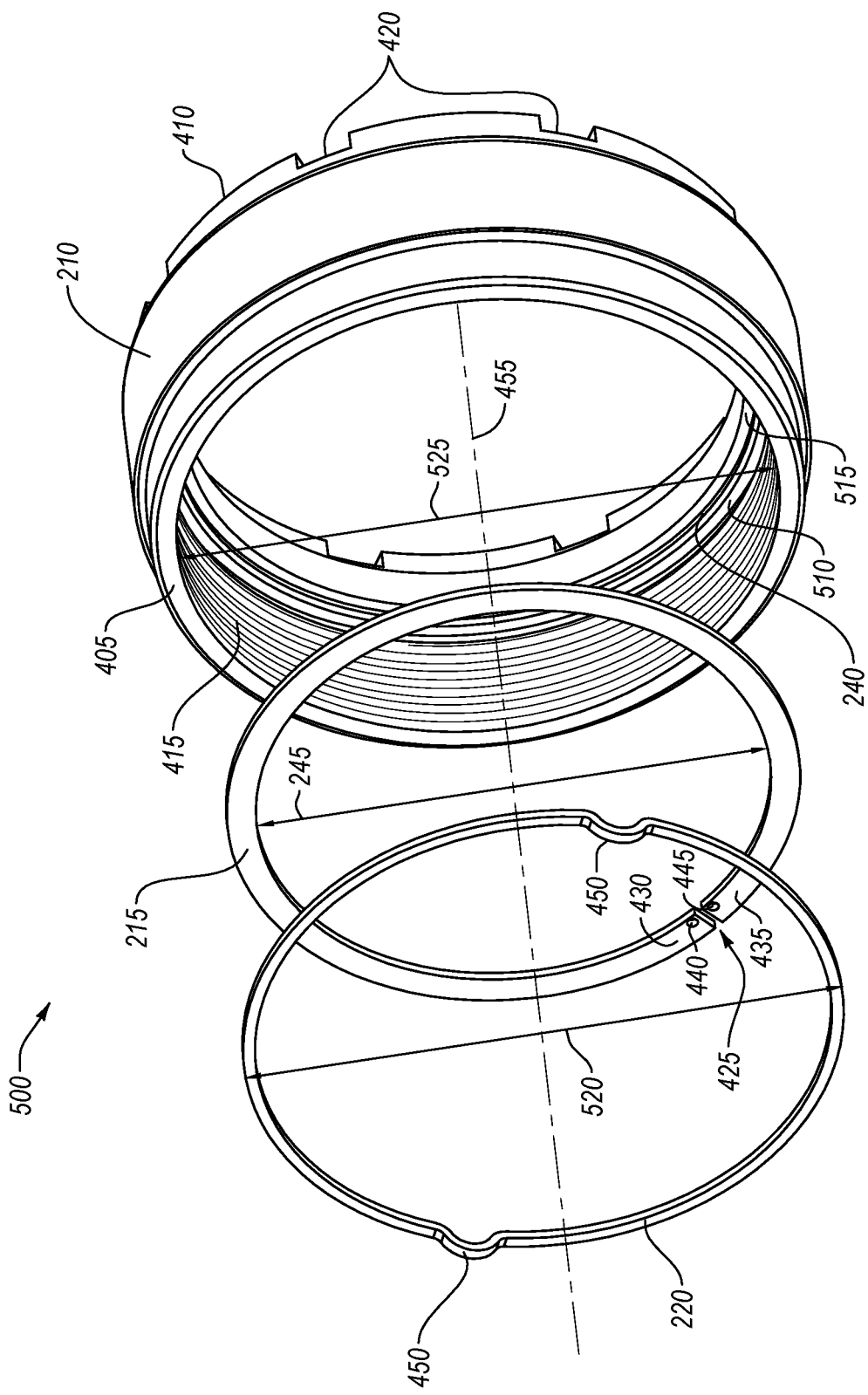
FIG. 5 is an exploded perspective view of the portion of the first coupling assembly of FIG. 4.

Referring to FIG. 5, an exploded perspective view of one embodiment of a portion 500 of the first coupling assembly 105 of FIG. 4 is shown. Specifically, sidewalls 510, 515 of the first internal groove 240 are illustrated. As may be appreciated, the first retainer clip 215 may be compressed sufficiently to insert the first retainer clip 215 between the sidewalls 510, 515 of the first internal groove 240.

The spring 220 is illustrated as being annular shaped and including the at least one lateral extension 450. Indeed, the illustrated spring 220 includes two lateral extensions 450. The lateral extensions 450 are formed by bumps on the spring 220 that extend parallel to the central axis 455 of the nut assembly 210. An outer diameter 520 of the spring 220 is sized so that the spring 220 may be positioned within an inner diameter 525 of the nut assembly 210.

Figure 6:
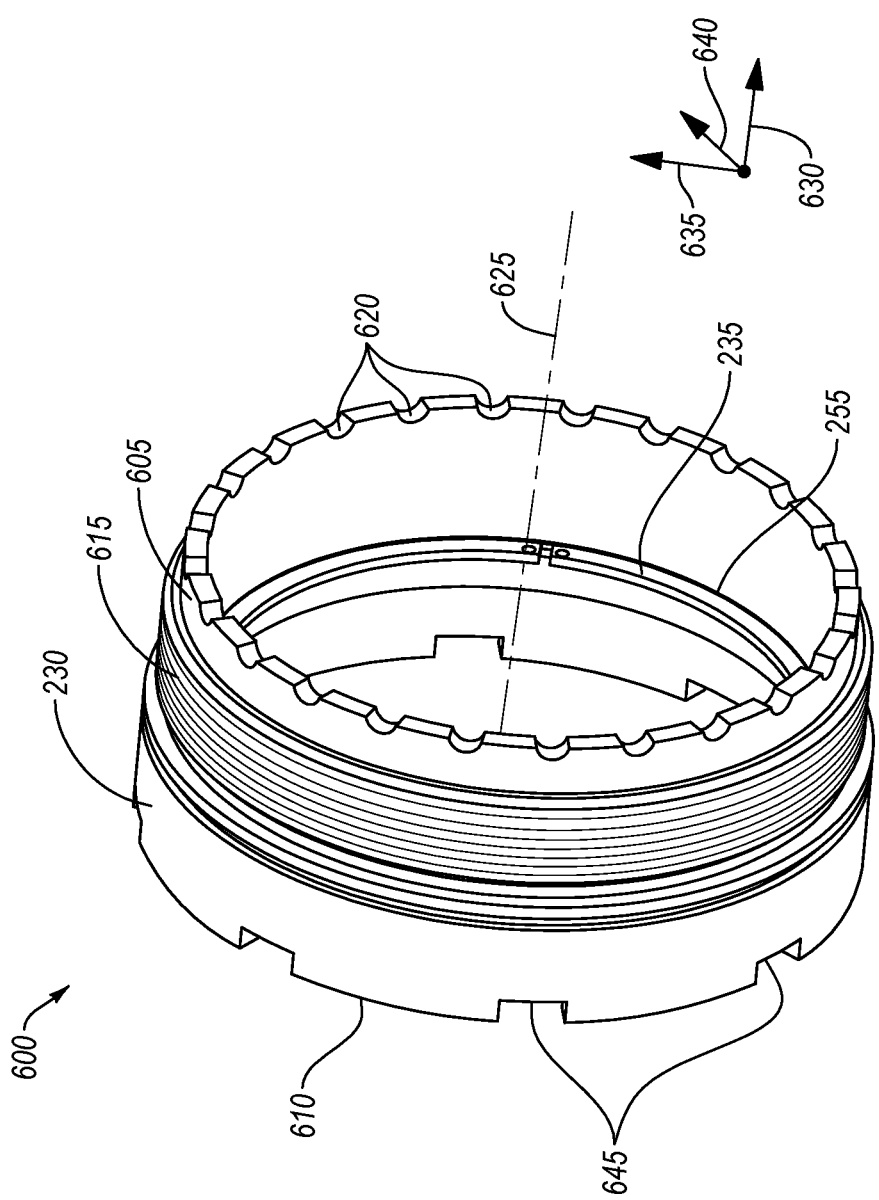
FIG. 6 is a perspective view of one embodiment of a portion of a second coupling assembly of the apparatus of FIG. 1.

Referring to FIG. 6, a perspective view of one embodiment of a portion 600 of the second coupling assembly 110 of the apparatus 102 of FIG. 1 is shown. As illustrated, the coupling body 230 includes a first end 605 and a second end 610 opposite the first end 605. The first end 605 of the coupling body 230 is configured to mate with the nut assembly 210. On an external portion of the coupling body 230 adjacent to the first end 605, the coupling body 230 includes threads 615 used to couple the coupling body 230 to threads 415 of the nut assembly 210. Moreover, the first end 605 of the coupling body 230 includes multiple notches 620 extending parallel to a central axis 625 of the coupling body 230. The notches 620 and the central axis 625 extend in an axial direction 630 that is perpendicular to radial directions 635, 640. The notches 620 are configured to receive the at least one lateral extension 450 of the spring 220 to be self-locking to prevent rotation of the coupling body 230 relative to the nut assembly 210 when the coupling body 230 is mated to the nut assembly 210. Accordingly, the notches 620 and the at least one lateral extension 450 of the spring 220 are used to lock the first and second coupling assemblies 105, 110 together without any additional hardware, such as lockwire, etc. Therefore, connection of the first and second coupling assemblies 105, 110 may be performed faster and with less expense then configurations that are not self-locking. It should be noted that the second retainer clip 235 when inserted into the second internal groove 255 is configured to apply a radial outward force in the radial directions 635, 640 toward the second internal groove 255.

On the second end 610 of the coupling body 230, multiple features 645 (i.e., notches, teeth) for matingly engaging a torque-application tool are disposed. The features 645 may be configured for applying torque to the coupling body 230 for coupling together the coupling body 230 and the nut assembly 210. In other configurations, the coupling body 230 may not include the features 645 and may be hand tightened to the nut assembly 210 instead of being coupled using a torque-application tool.

Figure 7:
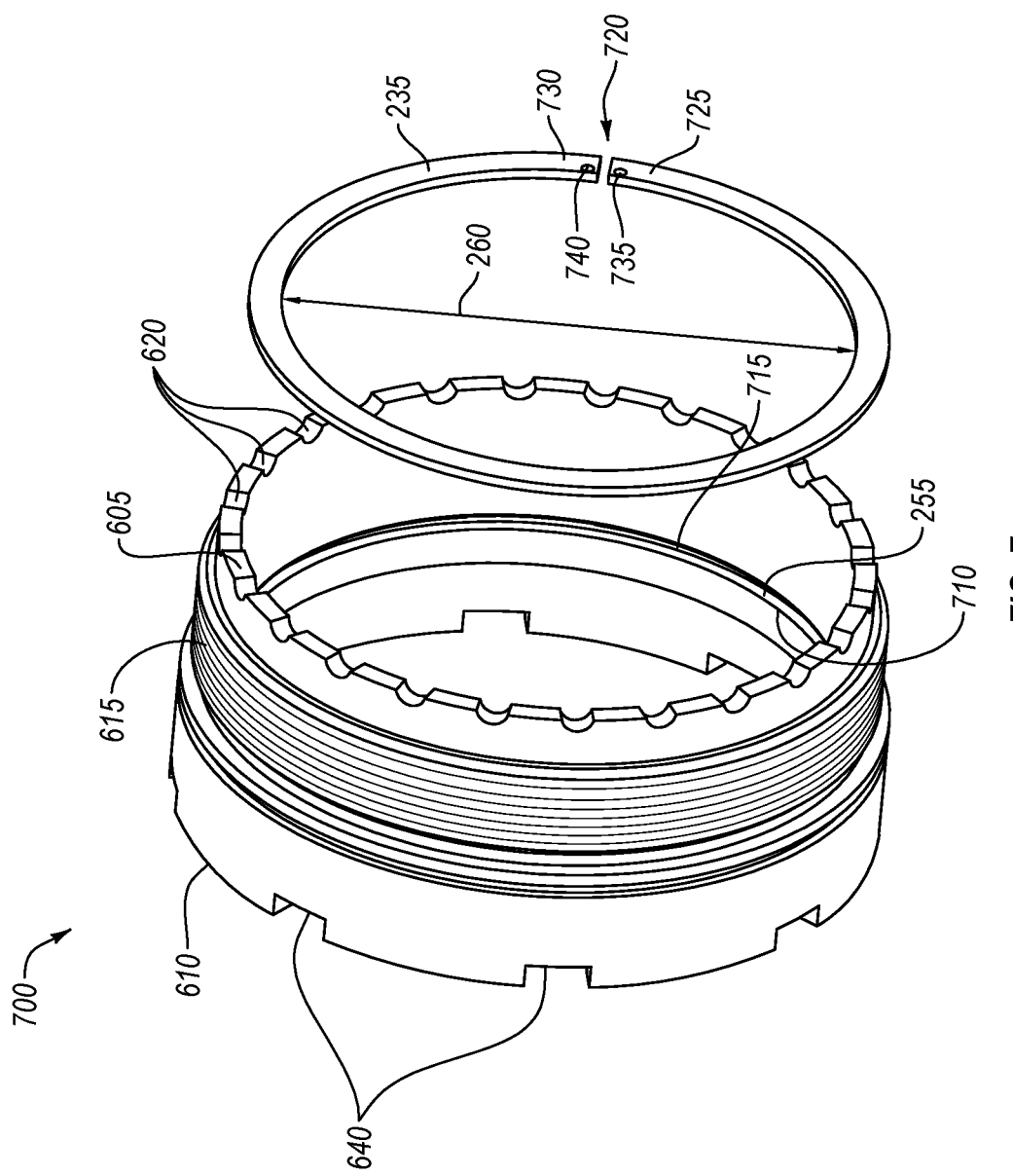
FIG. 7 is an exploded perspective view of the portion of the second coupling assembly of FIG. 6.

Referring to FIG. 7, an exploded perspective view of one embodiment of a portion 700 of the second coupling assembly 110 of FIG. 6 is shown. Specifically, sidewalls 710, 715 of the second internal groove 255 are illustrated. As may be appreciated, the second retainer clip 235 may be compressed sufficiently to insert the second retainer clip 235 between the sidewalls 710 and 715 of the second internal groove 255.

Indeed, as illustrated, the second retainer clip 235 may be substantially shaped such that a gap 720 is formed between a first end 725 of the second retainer clip 235 and a second end 730 of the second retainer clip 235. Moreover, a first gripping portion 735 is positioned near the first end 725 of the second retainer clip 235, and a second gripping portion 740 is positioned near the second end 730 of the second retainer clip 235. The first and second gripping portions 735, 740 may be any suitable protrusion extending from the second retainer clip 235 that can be used for applying a force to the first and second ends 725, 730 of the second retainer clip 235. The first and second gripping portions 735, 740 facilitate insertion of the second retainer clip 235 into the second internal groove 255 and removal of the second retainer clip 235 from the second internal groove 255. For example, applying a force to direct the first and second gripping portions 735, 740 toward one another may be used to decrease an outer diameter of the second retainer clip 235 to facilitate insertion of the second retainer clip 235 into the second internal groove 255 and removal of the second retainer clip 235 from the second internal groove 255.

Figure 8:
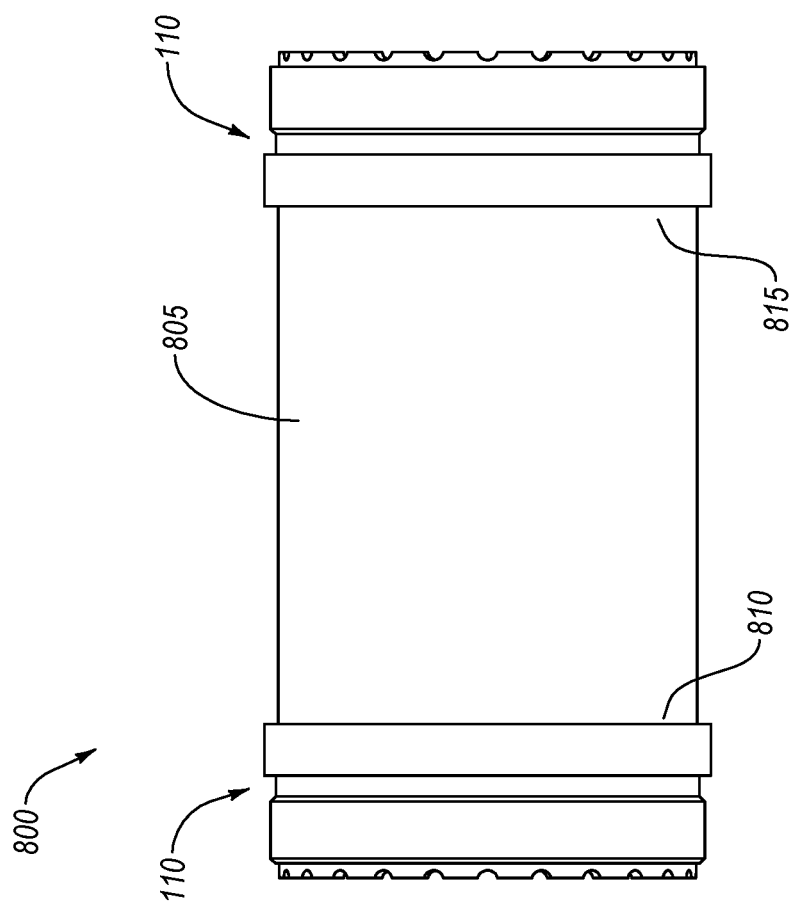
FIG. 8 is a perspective view of one embodiment of a shroud assembly for coupling together first and second tubular components of a duct assembly.

Referring to FIG. 8, a perspective view of one embodiment of a shroud assembly 800 for coupling together first and second tubular components of a duct assembly is shown. The shroud assembly 800 includes a tube 805 having the second coupling assembly 110 coupled to a first end 810 of the tube 805, and the second coupling assembly 110 coupled to a second end 815 of the tube 805. As may be appreciated, even though the second coupling assembly 110 is coupled to the first and second ends 810, 815 of the tube 805, in other configurations, any of the first and second coupling assemblies 105, 110 may be coupled to the first end 810 of the tube 805. Moreover, in certain configurations, any of the first and second coupling assemblies 105, 110 may be coupled to the second end 815 of the tube 805. Accordingly, the shroud assembly 800 may be used to couple first and second tubular components together. As may be appreciated, one or more of the tube 805 and the second coupling assemblies 110 may be flexible, and/or one or more of the tube 805 and the second coupling assemblies 110 may be rigid.

Figure 9:
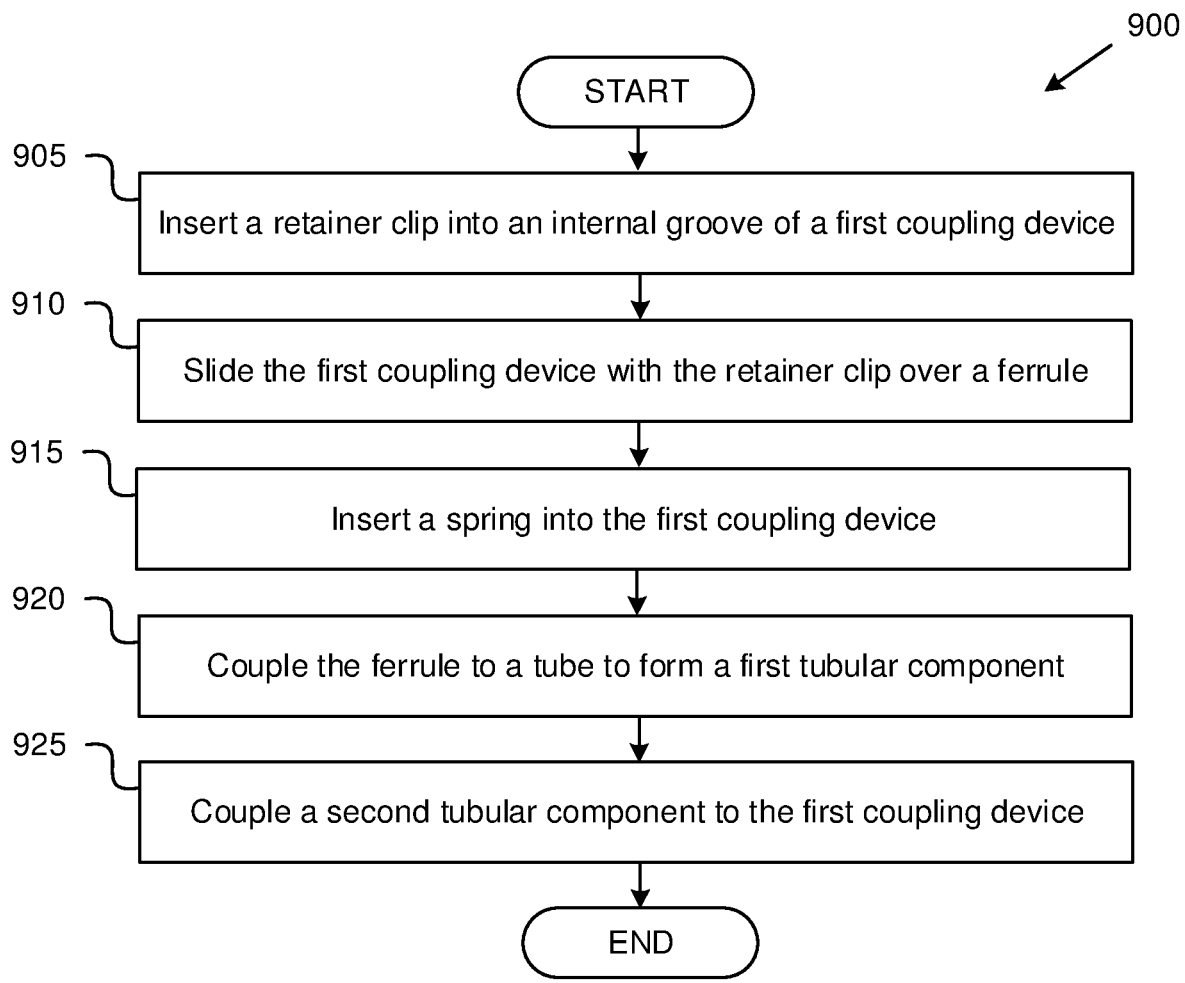
FIG. 9 is a schematic flow diagram of one embodiment of a method of coupling together first and second tubular components.

Referring to FIG. 9, a method 900 of coupling together first and second tubular components, such as the first tubular component 115 and the second tubular component 120, is shown. The method 900 includes inserting a retainer clip (e.g., retainer clips 215, 235) into an internal groove (e.g., internal groove 240, 255) of a first coupling device (e.g., first coupling device 210, 230) at 905. The retainer clip is configured to apply a radially outward force to the internal groove when inserted in the internal groove.

The method 900 includes sliding the first coupling device with the retainer clip over a ferrule (e.g., ferrule 205, 225) at 910. The retainer clip is configured to prevent movement of the first coupling device relative to the ferrule when the retainer clip has an unbiased inner diameter (e.g., inner diameter 245, 260) smaller than an outer diameter (e.g., outer diameter 250, 265) of the ferrule or the retainer clip is not properly inserted into the internal groove of the first coupling device. Accordingly, the incorrect components are prevented from being assembled together. The first coupling device, the retainer clip, and the ferrule are in contact with one another to form an electrically conductive path (e.g., electrically conductive path 310, 315) through the first coupling device, the retainer clip, and the ferrule.

The method 900 includes inserting a spring (e.g., spring 220) into the first coupling device at 915. The spring is positionable within the first coupling device. Moreover, the spring includes at least one lateral extension (e.g., lateral extension 450) extending parallel to a central axis (e.g., central axis 455) of the first coupling device. The method 900 includes coupling the ferrule to a tubular component (e.g., tubular components 115, 120 or tube 805) to form a first tubular assembly (e.g., tubular assemblies 105, 110, or shroud assembly 800) at 920.

The method 900 includes coupling a second tubular component having a second coupling device to the first coupling device at 925. The second coupling device includes at least one notch (e.g., notch 620) configured to receive the at least one lateral extension to prevent rotation of the first coupling device relative to the second coupling device, such that the second coupling device and the first coupling device are self-locking when mated together.

Figure 10:
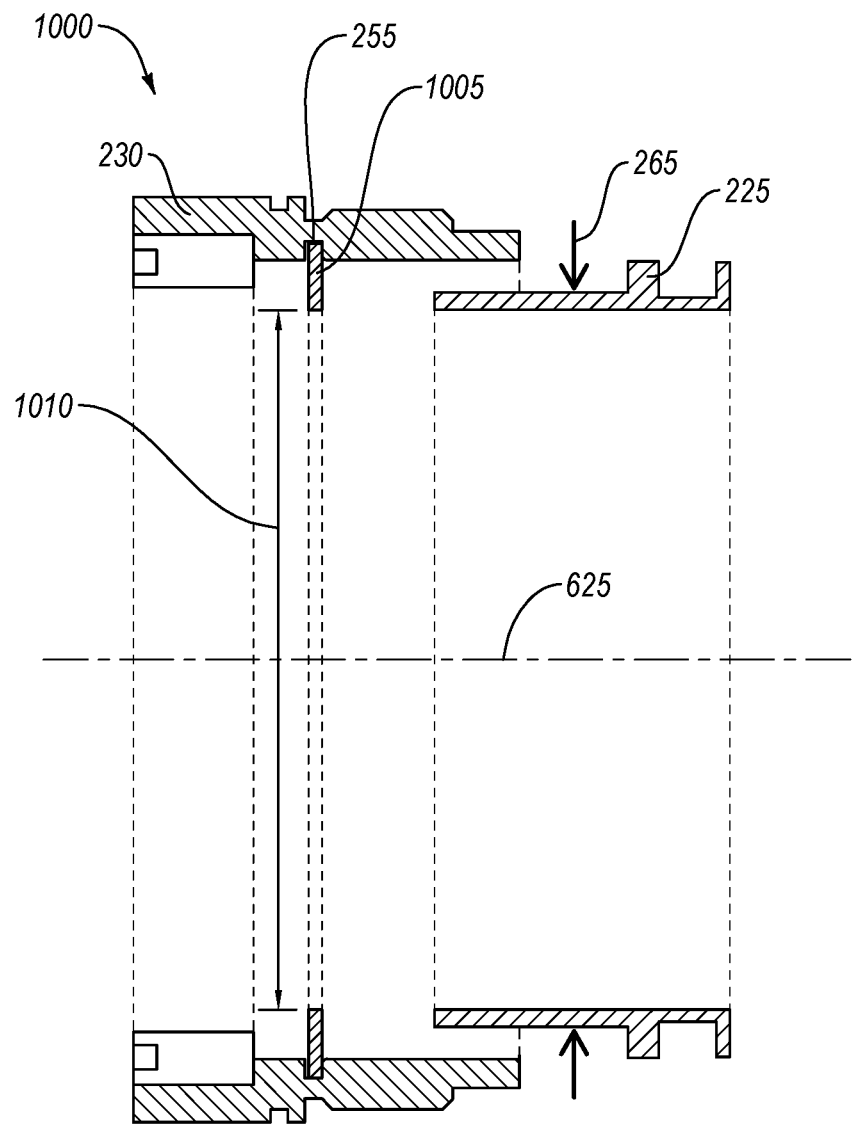
FIG. 10 is a cross-sectional view of a portion of the second coupling assembly of FIG. 1.

Referring to FIG. 10, a cross-sectional view 1000 of a portion of the second coupling assembly 110 of FIG. 1 is illustrated showing an incorrectly sized retainer clip 1005 positioned within the second internal groove 255 of the coupling body 230. The retainer clip 1005 may have an outer diameter that enables insertion into the second internal groove 255; however, an inner diameter 1010 of the retainer clip 1005 is smaller than the outer diameter 265 of the second ferrule 225 so that the second ferrule 225 is blocked from being fully positioned in the retainer clip 1005 and/or the coupling body 230. As may be appreciated, to aid in manufacturing coupling assemblies, retainer clips may be sized so that only predetermined combinations of inner and outer diameters are used. In such configurations, the predetermined combinations may exclude retainer clips having an outer diameter that may be positioned within the second internal groove 255 and an inner diameter that is too large for the outer diameter 265 of the second ferrule 225. While this drawing illustrates a portion of the second coupling assembly 110, similar features may be part of the first coupling assembly 105.

Figure 11:
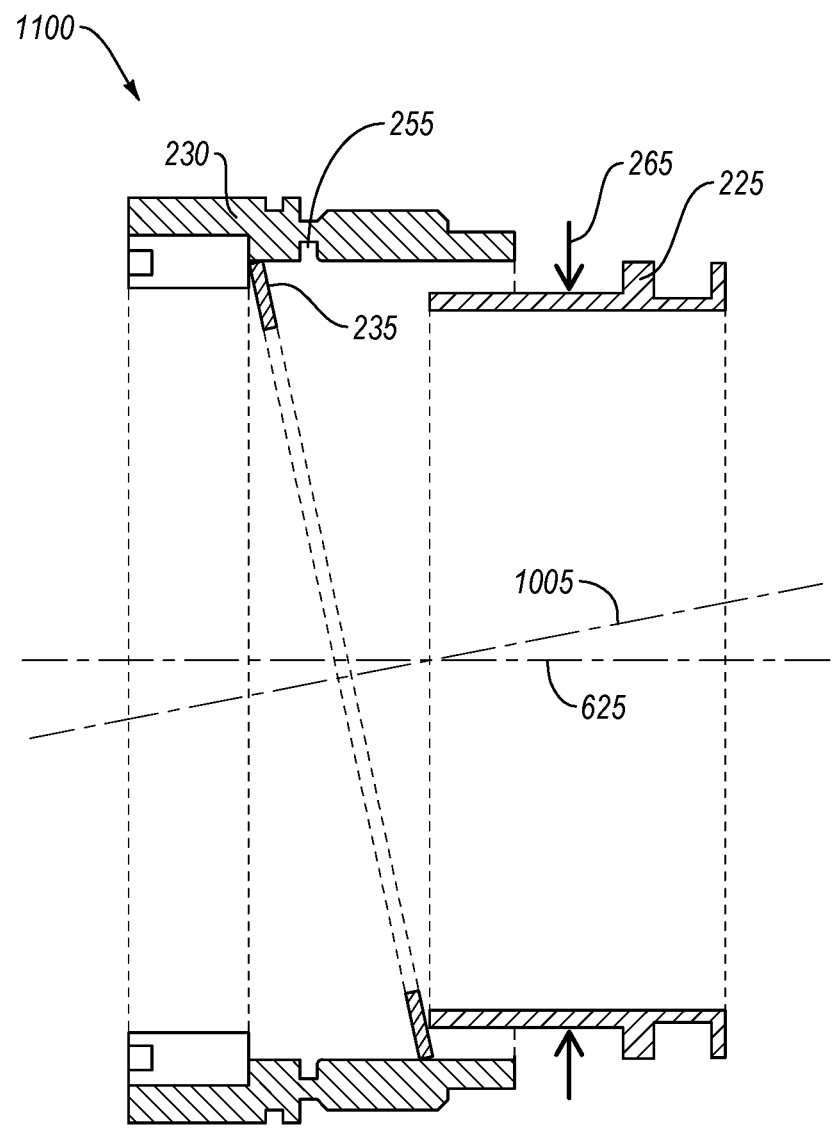
FIG. 11 is another cross-sectional view of a portion of the second coupling assembly of FIG. 1.

Referring to FIG. 11, another cross-sectional view 1100 of a portion of the second coupling assembly 110 of FIG. 1 is illustrated showing an incorrectly positioned second retainer clip 235 within the coupling body 230. Specifically, the second retainer clip 235 is positioned at an angle such that a central axis 1005 of the second retainer clip 235 is not substantially parallel to the central axis 625 of the coupling body 230. Therefore, the second ferrule 225 is blocked from being fully positioned in the second retainer clip 235 and/or the coupling body 230. While this drawing illustrates a portion of the second coupling assembly 110, similar features may be part of the first coupling assembly 105.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An apparatus for coupling together first and second tubular components of a duct assembly, comprising:
   a first coupling assembly comprising:
      a nut assembly comprising internal threads and a first internal groove;
      a first retainer clip positionable in the first internal groove of the nut assembly, wherein the first retainer clip is biased to apply a radially outward force against the first internal groove when the first retainer clip is positioned in the first internal groove;

a first ferrule, coupleable to the nut assembly, in contact with the first retainer clip when coupled to the nut assembly to form a first electrically conductive path through the nut assembly, the first retainer clip, and the first ferrule, wherein the first ferrule is configured to be coupled to a first end of the first tubular component; and a spring positionable within the nut assembly adjacent to the first retainer clip, wherein the spring comprises at least one lateral extension extending parallel to a central axis of the nut assembly, wherein the at least one lateral extension having a semi-circular protrusion that extends parallel to the central axis of the nut assembly, and the semi-circular protrusion is an entire width of the spring in a radial axis; and a second coupling assembly comprising:

a coupling body comprising external threads, a second internal groove, and at least one notch on a first end of the coupling body configured to mate with the nut assembly, wherein the external threads of the coupling body are configured to mate with the internal threads of the nut assembly, and the at least one notch is configured to receive the at least one lateral extension of the spring to prevent rotation of the coupling body relative to the nut assembly;

a second retainer clip positionable in the second internal groove of the coupling body, wherein the second retainer clip is biased to apply a radially outward force against the second internal groove when the second retainer clip is positioned in the second internal groove; and a second ferrule, coupleable to the coupling body, in contact with the second retainer clip when coupled to the coupling body to form a second electrically conductive path through the coupling body, the second retainer clip, and the second ferrule, wherein the second ferrule is configured to be coupled to a second end of the second tubular component;

wherein one or more of:

the first retainer clip is configured to prevent movement of the nut assembly relative to the first ferrule when the first retainer clip has an unbiased inner diameter smaller than an outer diameter of the first ferrule or the first retainer clip is not properly inserted into the first internal groove of the nut assembly; and the second retainer clip is configured to prevent movement of the coupling body relative to the second ferrule when the second retainer clip has an unbiased inner diameter smaller than an outer diameter of the second ferrule or the second retainer clip is not properly inserted into the second internal groove of the coupling body.

2. The apparatus of claim 1, wherein the first and second retainer clips are substantially c-shaped.

3. The apparatus of claim 2, wherein the first and second retainer clips comprise gripping portions adjacent to first and second ends of the c-shape to facilitate installation and removal of the first and second retainer clips.

4. The apparatus of claim 1, wherein:

the nut assembly comprises a first end configured to mate with the coupling body and a second end opposite the first end; and the second end comprises features for matingly engaging a torque-application tool, configured to apply torque to the nut assembly for coupling together the nut assembly and the coupling body.

5. The apparatus of claim 1, wherein:

the coupling body comprises a second end opposite the first end; and the second end comprises features for matingly engaging a torque-application tool, configured to apply torque to the coupling body for coupling together the coupling body and the nut assembly.

6. The apparatus of claim 1, wherein the second retainer clip is configured to prevent movement of the coupling body relative to the second ferrule when the second retainer clip has an unbiased inner diameter smaller than an outer diameter of the second ferrule or the second retainer clip is not properly inserted into the second internal groove of the coupling body.

7. The apparatus of claim 1, wherein the first retainer clip is configured to prevent movement of the nut assembly relative to the first ferrule when the first retainer clip has an unbiased inner diameter smaller than an outer diameter of the first ferrule or the first retainer clip is not properly inserted into the first internal groove of the nut assembly.

8. The apparatus of claim 1, wherein the coupling body is rigid.

9. The apparatus of claim 1, wherein the coupling body is flexible.

10. The apparatus of claim 1, wherein:

the spring is annular shaped; and the at least one lateral extension comprises a plurality of semi-circular protrusions on the spring, the plurality of semi-circular protrusions extending parallel to the central axis of the nut assembly and being the entire width of the spring in the radial axis.

11. The apparatus of claim 1, wherein the at least one notch of the coupling body comprises a plurality of notches for receiving a plurality of lateral extensions protruding from the spring.

12. The apparatus of claim 1, further comprising a tube, wherein the first coupling assembly is coupled to a first end of the tube and the second coupling assembly is coupled to a second end of the tube.

13. The apparatus of claim 12, wherein the tube is flexible.

14. The apparatus of claim 12, wherein the tube is rigid.

15. An apparatus for coupling together first and second tubular components of a duct assembly, comprising:

a first coupling assembly, comprising:

a first coupling device comprising first threads and a first internal groove;

a first retainer clip positionable in the first internal groove, wherein the first retainer clip is biased to apply a radially outward force against the first internal groove when the first retainer clip is positioned in the first internal groove;

a first ferrule, coupleable to the first coupling device, in contact with the first retainer clip when coupled to the first coupling device to form a first electrically conductive path through the first coupling device, the first retainer clip, and the first ferrule, wherein the first retainer clip is configured to prevent movement of the first coupling device relative to the first ferrule when the first retainer clip has an unbiased inner diameter smaller than an outer diameter of the first ferrule or the first retainer clip is not properly inserted into the first internal groove of the first coupling device; and a spring having at least one lateral extension having a semi-circular protrusion that extends parallel to a central axis of the first coupling device, wherein the semi-circular protrusion is an entire width of the spring in a radial axis.

16. The apparatus of claim 15, wherein the spring is configured to prevent rotation of the coupling device relative to another coupling device.

17. The apparatus of claim 15, further comprising a second coupling assembly comprising:
- a second coupling device comprising second threads and a second internal groove;
- a second retainer clip positionable in the second internal groove, wherein the second retainer clip is biased to apply a radially outward force against the second internal groove when the second retainer clip is positioned in the second internal groove; and
- a second ferrule, coupleable to the second coupling device, in contact with the second retainer clip when coupled to the second coupling device to form a second electrically conductive path through the second coupling device, the second retainer clip, and the second ferrule, wherein the second retainer clip is configured to prevent movement of the second coupling device relative to the second ferrule when the second retainer clip has an unbiased inner diameter smaller than an outer diameter of the second ferrule or the second retainer clip is not properly inserted into the second internal groove of the second coupling device;
- wherein the first coupling assembly is coupled to the second coupling assembly.

* * * * *